US011383749B1

(12) United States Patent
Kuehner

(10) Patent No.: US 11,383,749 B1
(45) Date of Patent: Jul. 12, 2022

(54) TWO-PART STEERING APPARATUS FOR AUTOMATED DRIVING

(71) Applicant: TOYOTA RESEARCH INSTITUTE, INC., Los Altos, CA (US)

(72) Inventor: Manuel Ludwig Kuehner, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 17/126,541

(22) Filed: Dec. 18, 2020

(51) Int. Cl.
  *B62D 1/06* (2006.01)
  *B62D 5/00* (2006.01)
  *B62D 1/10* (2006.01)
  *F16H 1/22* (2006.01)

(52) U.S. Cl.
  CPC .............. B62D 1/06 (2013.01); B62D 1/10 (2013.01); B62D 5/001 (2013.01); B62D 5/006 (2013.01); F16H 1/227 (2013.01)

(58) Field of Classification Search
  CPC .......................... B62D 5/001; F16H 1/227
  See application file for complete search history.

(56) References Cited

U.S. PATENT DOCUMENTS

| 6,227,327 B1 * | 5/2001 | Nigrin ................. B62D 15/02 180/402 |
| 7,878,294 B2 | 2/2011 | Morikawa |
| 9,919,741 B2 | 3/2018 | Kim et al. |
| 2013/0002416 A1 | 1/2013 | Gazit |
| 2018/0229767 A1 | 8/2018 | James |
| 2019/0002010 A1 * | 1/2019 | Cao ........................ B62D 5/006 |
| 2019/0009794 A1 | 1/2019 | Toyoda et al. |

OTHER PUBLICATIONS

W. Schwarting et al., "Safe Nonlinear Trajectory Generation for Parallel Autonomy with a Dynamic Vehicle Model,"; IEEE Transactions on Intelligent Transportation Systems; 2017; 16 pgs.; https://pure.tudelft.nl/portal/files/37853894/journal_pa_mpc_8_.pdf.

* cited by examiner

Primary Examiner — Vicky A Johnson
(74) Attorney, Agent, or Firm — Dinsmore & Shohl LLP

(57) ABSTRACT

A multi-part steering apparatus includes an outer rim and an inner hub. The outer rim rotates relative to the inner hub with an adjustable rotation resistance. A rotatable mechanical interface connected the outer rim to the inner hub, and a damper connects to the rotatable mechanical interface. The damper is configured to change the rotation resistance between the outer rim and inner hub. The rotatable mechanical interface may include a gear track disposed on an inside portion of the outer rim and a gear system attached to the inner hub and positioned to mesh with the gear track. The damper may include an electric motor connected to the rotatable mechanical interface and an adjustable load connected to terminals of the electric motor.

20 Claims, 4 Drawing Sheets

TWO-PART STEERING APPARATUS FOR AUTOMATED DRIVING

TECHNICAL FIELD

The present specification generally relates to human machine interfaces for vehicles and, more specifically, a two-part steering apparatus for blending human steering inputs with autonomous steering controls.

BACKGROUND

Vehicles increasingly include driver assistance features such as lane departure avoidance, adaptive cruise control, blind spot warning, collision avoidance, or assisted parking. Driver assistance features may be included in various levels of autonomous vehicles ranging from level 1 partially autonomous vehicles to level 5 fully autonomous vehicles. In some driving situations, autonomous vehicles may automatically control steering of a vehicle. In other driving situations, a driver may provide steering inputs to the steering wheel to control the steering of the vehicle. Some autonomous vehicles may take over steering control from the driver in order to avoid a collision or avoid a lane departure. In some driving situations, the autonomous vehicle may return steering control of the vehicle to the drivers, such as when the autonomous system is unable to determine a safe vehicle trajectory. Cooperation between the autonomous vehicle and human drivers is facilitated by communicating a distinction between autonomous steering and manual steering. However, a suitable input device that allows intuitive blending of human and autonomous control is not available.

Accordingly, a need exists for a two-part steering apparatus for blending human steering inputs with autonomous steering controls.

SUMMARY

In one embodiment, a multi-part steering apparatus includes an outer rim and an inner hub. The outer rim rotates relative to the inner hub with an adjustable rotation resistance.

In another embodiment, a rotatable mechanical interface connects the outer rim to the inner hub, and a damper connects to the rotatable mechanical interface. The damper is configured to change the rotation resistance between the outer rim and inner hub.

In yet another embodiment, the rotatable mechanical interface includes a rack and pinion mechanism.

In yet another embodiment, the rotatable mechanical interface includes a gear track disposed on an inside portion of the outer rim and one or more gears attached to the inner hub and positioned to mesh with the gear track.

In yet another embodiment, the rotatable mechanical interface includes a friction track disposed on an inside portion of the outer rim and one or more wheels attached to the inner hub and positioned to contact the friction track.

In yet another embodiment, the damper includes an electric motor connected to the rotatable mechanical interface and an adjustable load connected to terminals of the electric motor.

In yet another embodiment, the damper is further configured to receive a weighting signal from a vehicle computing device, and change the rotation resistance by adjusting the adjustable load based on the weighting signal.

In yet another embodiment, the inner hub is connected to a vehicle steering system.

In yet another embodiment, the vehicle steering system includes a drive-by-wire steering system.

In yet another embodiment, the vehicle steering system includes a mechanical steering system.

In yet another embodiment, a vehicle includes a two-part steering wheel of any of the above embodiments.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Some autonomous vehicles provide intermittent or variable driver assistance features. For example, a collision avoidance driver assistance feature may allow a driver to have full control of the vehicle until the driver's actions may result in a collision. The collision avoidance driver assistance feature may take over steering control from the driver in response to detecting a possible collision. In other situations, an autonomous vehicle may allow the driver to partially influence the steering of the vehicle, and blend the driver's steering inputs with autonomous vehicle controller steering commands.

When an autonomous vehicle controller is blending driver steering inputs with autonomous vehicle controller steering commands, communication to the driver regarding what steering commands are being performed and the amount of influence the driver's steering inputs have on the trajectory of the vehicle improves cooperation between the autonomous vehicle controller and the driver. For example, as the driver steers the vehicle, if the autonomous vehicle controller takes control of the steering and begins to steer in a different direction than the inputs of the driver, the driver may be alarmed or annoyed. A haptic feedback mechanism can enable the autonomous vehicle to communicate autonomous control intentions to the driver. It is also desirable to allow the driver to continue to provide some amount of input to the vehicle's steering system, blending driver steering inputs with autonomous steering intentions. One example of where blended steering may be useful is when an autonomous control system fails to detect a minor obstacle such as a bump or pothole. Blending driver steering inputs with autonomous navigation allows the autonomous control system to establish a general trajectory, while allowing human driver to provide fine controls.

According to embodiments disclosed herein, a two-part steering wheel provides a mechanism for indicating actual steering of the vehicle to the driver, while simultaneously allowing the driver to provide steering inputs, and providing a haptic indication to the driver regarding how much influence the driver's steering inputs have on the actual steering of the vehicle. The driver's steering inputs may be variably blended with autonomous vehicle controller steering commands, and the weight given to the driver's commands may be communicated to the driver through the two-part steering wheel. According to some embodiments, the weight given to the driver's commands may be indicated through the rotation resistance or weight of the two-part steering wheel.

Figure 1:
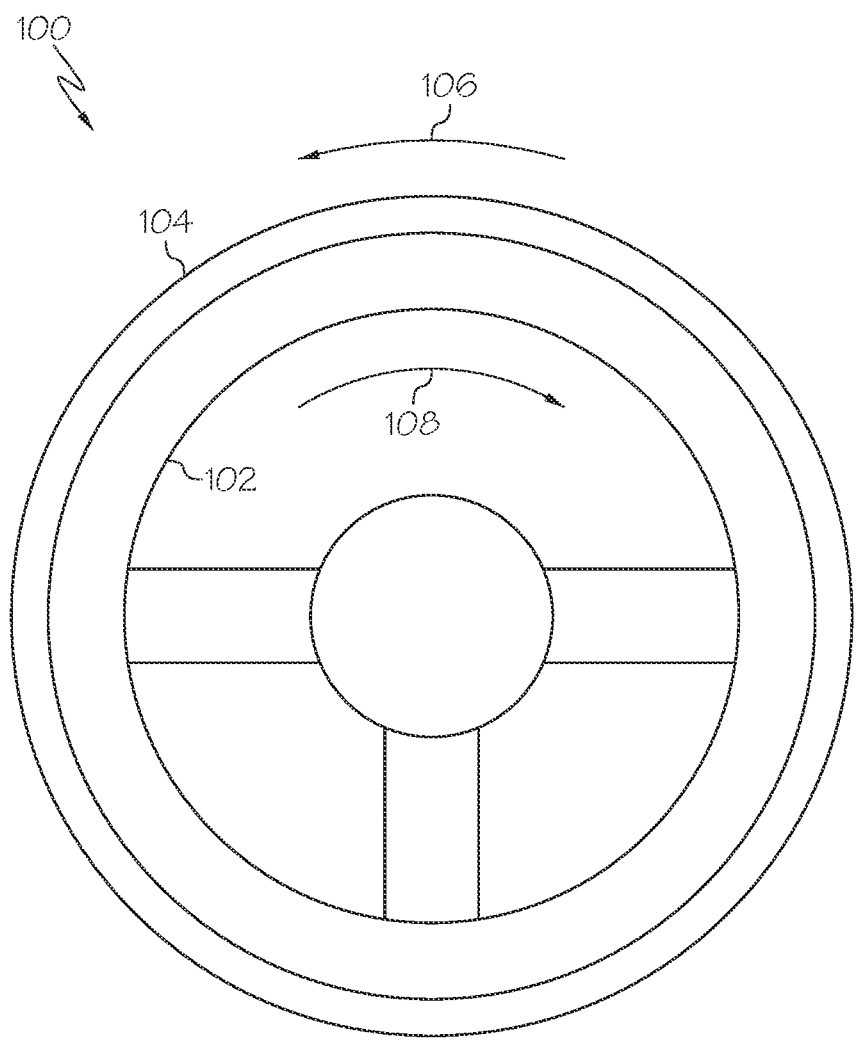
FIG. 1 depicts a two-part steering wheel comprising an inner hub and an outer rim, according to one or more embodiments shown and described herein.

Referring now to FIG. 1, a two-part steering wheel 100 is illustrated, according to one or more embodiments shown and described herein. The two-part steering wheel 100 includes an inner hub 102 and outer rim 104. According to some embodiments, the outer rim 104 and inner hub 102 are configured rotate independently of each other, as indicated by the rotation arrows 106, 108, with varying rotation resistance between the outer rim 104 and inner hub 102.

According to some embodiments, the inner hub may be configured to indicate the actual steering of the vehicle, similar to a traditional steering wheel. The actual steering of the vehicle may be determined by autonomous steering commands, a driver's steering inputs to the outer rim, or any combination thereof. The outer rim 104 may receive a driver's steering inputs. Thus the position of the inner hub 102, which indicates the actual steering of the vehicle, may be at least partially influenced by driver inputs to the outer rim 104. The varying rotation resistance between the outer rim 104 and inner hub 102 may enable and communicate varying degrees of driver input, including full manual steering control of the vehicle, various degrees of partial manual steering control of the vehicle, and full autonomous steering control of the vehicle.

In the full manual steering control state, the weighting of the driver steering inputs is increased so that the rotation resistance causes the inner hub 102 to rotate in sync with the outer rim 104. Thus, in the full manual steering control state, the steering wheel operates as a traditional steering wheel with the inner hub 102 moving in unison with the outer rim 104. In the full autonomous steering control state, the rotation resistance is minimal and allows the outer rim 104 to rotate without transferring rotation to the inner hub 102. Thus, driver steering inputs to the outer rim 104 have no influence on the actual steering of the vehicle in the full autonomous steering state.

In a partial manual steering state, rotation resistance causes some portion of the manual inputs to the outer rim 104 to be transferred to the inner hub 102 such that the rotation rate of the inner hub 102 is lower than the rotation rate of the outer rim 104. As the weighting of the driver steering inputs is increased, the rotation resistance also increases and more rotation is transferred from the outer rim 104 to the inner hub 102. The rotation resistance transfers some of the natural weight of the steering through haptic feedback to the driver. This haptic feedback indicates, to the driver, the amount of influence the driver's steering inputs are given to the actual steering of the vehicle. Likewise, as the weighting of the driver steering inputs decreases, less rotation is transferred from the outer rim 104 to the inner hub 102, providing a haptic feedback to the driver that indicates the reduced influence the driver's steering inputs are having on the actual steering of the vehicle. The rotation resistance between the outer rim 104 and inner hub 102 may be continuously variable, providing a continuously variable haptic feedback to the driver that indicates, to the driver, the amount of influence the driver's steering inputs are given to the actual steering of the vehicle.

Figure 2:
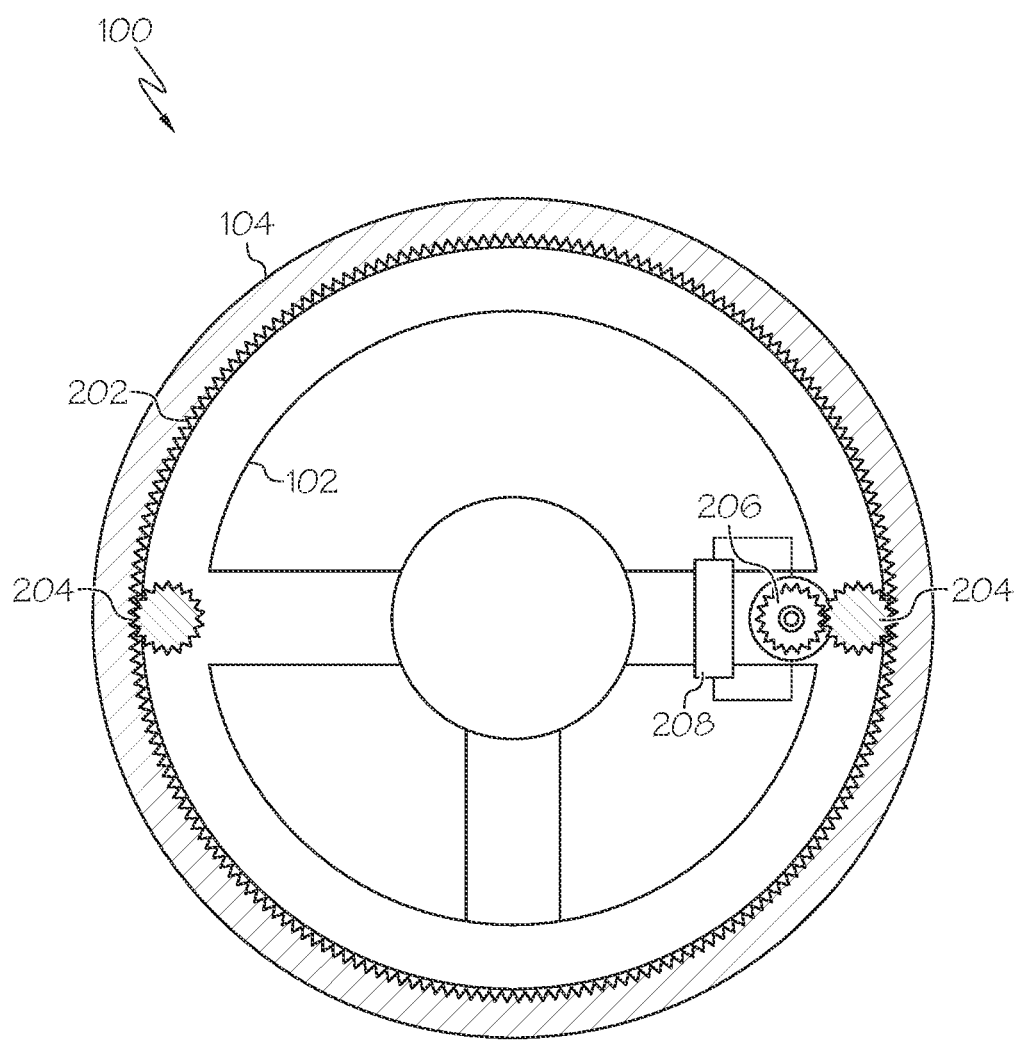
FIG. 2 depicts a cutaway view of the two-part steering wheel showing a rotatable mechanical interface and a damper, according to one or more embodiments shown and described herein.

FIG. 2 depicts a cutaway view of the two-part steering wheel showing a rotatable mechanical interface and a damper, according to one or more embodiments shown and described herein. According to some embodiments, the two-part steering wheel 100 includes a rotatable mechanical interface connecting the outer rim 104 to the inner hub 102. According to some embodiments, the rotatable mechanical interface includes a rack and pinion mechanism. The rotatable mechanical interface may include a gear track 202 disposed on an inside portion of the outer rim 104 and a gear system 204 attached to the inner hub 102 and positioned such that a gear of the gear system 204 is meshed with the gear track 202. According to some embodiments, the gear system 204 comprises one or more gears.

According to some embodiments, the teeth of the gear track 202 may be pointed toward the center of the two-part steering wheel. According to some embodiments, the teeth of the gear track 202 point outward (out of the page) toward the driver, or inward away from the driver and gear system 204 is positioned and oriented such that a gear of the gear system is meshed with the gear track 202. A person of ordinary skill in the art will recognize that different orientations of the gear track 202 and gear system 204 may be positioned and oriented in a variety of different ways without departing from the spirit and scope of the disclosed embodiments.

As the outer rim 104 is rotated relative to the inner hub 102, gears of the gear system 204 also rotate. The rotation resistance between the outer rim 104 and inner hub 102 may be adjusted by a damper connected to the gear system 204. According to some embodiments, the damper may be connected to one gear system 204. According to some embodiments, a separate damper may be connected to each of multiple gear systems 204 meshed with the gear track 202. According to an embodiment presented for non-limiting illustration purposes only, the gear system 204 comprises a pinion gear. According to some embodiments, the gear system 204 comprises a set of gears such that a total gear ratio of the gear system and the gear track is less than 1:1. The gear ratio of less than 1:1 increases the perceived rotation resistance produced by the damper. According to some embodiments, the gear system 204 comprises a set of gears such that a total gear ratio of the gear system and the gear track is greater than 1:1. The gear ratio of greater than 1:1 reduces the perceived rotation resistance produced by the damper.

According to some embodiments, the damper may include an electric motor 206 mechanically connected one or more of the gear systems 204. The electric motor may include a DC brushed motor, a DC brushless motor, an AC brushless motor, or any electric motor of which rotation can be electrically or magnetically damped. A person of ordinary skill in the art will understand that a variety of different electric motors may be used without departing from the spirit and scope of the disclosed embodiments.

According to some embodiments, the rotatable mechanical interface may include a friction track disposed on an inside portion of the outer rim 104 and one or more wheels attached to the inner hub 102 and positioned to contact the friction track. According to some embodiments, the damper may include an electric motor 206 mechanically connected one or more of the wheels. The electric motor may include a DC brushed motor, a DC brushless motor, an AC brushless motor. A person of ordinary skill in the art will understand that a variety of different electric motors may be used without departing from the spirit and scope of the disclosed embodiments.

According to some embodiments, the electric motor may be electrically connected to a variable impedance load 208. By adjusting the impedance of the variable impedance load, the resistance to rotation of the electric motor 206 may be adjusted, causing corresponding changes in the rotation resistance between the outer rim 104 and the inner hub 102. As the outer rim 104 is rotated relative to the inner hub 102, gears of the gear system 204 rotate. The gear system 204 is connected to the electric motor and transfers rotation to the rotor of the electric motor. As the rotor rotates, the coils of the electric motor move through a magnetic field, inducing current to flow through the coils. The variable impedance is connected to the coils and the induced current must pass through the variable impedance. As the impedance is decreased, the torque required to rotate the outer rim 104 at a given speed, or rotation resistance, increases. Similarly, as the impedance is increased, the torque required to rotate the outer rim 104 at the same given speed, or rotation resistance, is reduced. Variable impedance loads are well known and any variable impedance load may be suitable for the purposes of the disclosed embodiments.

Figure 3:
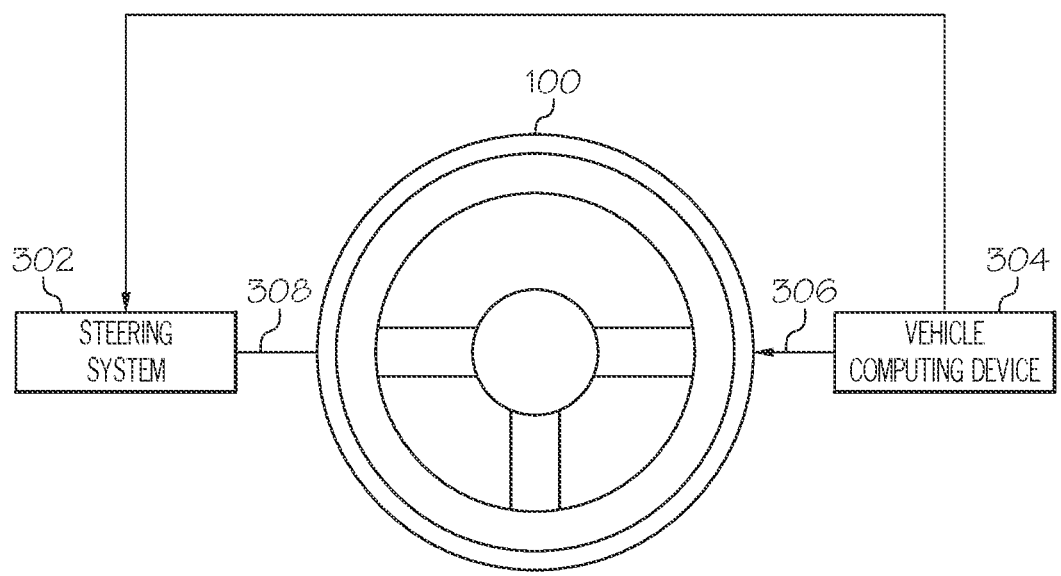
FIG. 3 depicts a two-part steering wheel connected to a steering system of a vehicle and a vehicle computing device to control rotation resistance between the outer rim and inner hub, according to one or more embodiments shown and described herein.

FIG. 3 depicts a two-part steering wheel connected to a steering system 302 of a vehicle and to a vehicle computing device 304 to control rotation resistance between the outer rim 104 and inner hub 102, according to one or more embodiments shown and described herein. According to some embodiments, the two-part steering wheel 100 is connected to a steering system 302 of a vehicle. The steering system 302 comprises any vehicle system that converts steering commands into actual steering of the vehicle. Steering commands may include steering commands generated by manual steering inputs to the steering wheel, autonomous steering commands 308 generated by an autonomous vehicle controller, or any combination thereof. The steering system may include a drive-by-wire steering system 302 or a mechanical steering system 302. A person of ordinary skill in the art will recognize that any available steering system may be used with the two-part steering wheel without departing from the spirit and scope of the disclosed embodiments.

According to some embodiments, the two-part steering wheel 100 may be connected to a vehicle computing device 304. The vehicle computing device 304 may include any computing device, including the computing device described with reference to FIG. 4. The connection between the two-part steering wheel 100 and the vehicle computing device 304 may include an electronic connection. The vehicle computing device 304 may be configured to output a steering weight signal 306. According to some embodiments, the two-part steering wheel 100 may be configured to receive the steering weight signal 306 and adjust the rotation resistance between the outer rim 104 and the inner hub 102 based on the steering weight signal. According to some embodiments, the adjustable load 208 may be adjusted based on the steering weight signal 306. The steering weight signal may represent a weighting of the driver's steering inputs in blending driver steering inputs with autonomous steering commands 308.

The vehicle computing device 304 may be configured to implement blended human and autonomous vehicle control. One example of an autonomous driver assistance system that enables cooperation between the autonomous vehicle controller and the driver is Toyota's Guardian™ autonomous system. The particulars of the vehicle computing device 304 are outside the scope of this application. However, any vehicle computing device 304 that outputs a steering weight signal 306 may be used to implement the disclosed embodiments.

Figure 4:
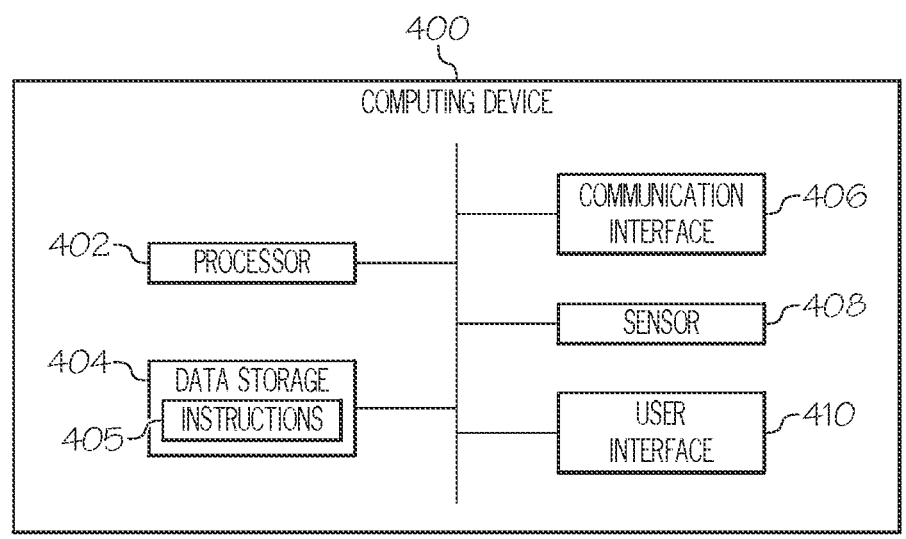
FIG. 4 depicts a block diagram of a computing device, according to one or more embodiments shown and described herein.

FIG. 4 depicts a block diagram of a computing device, according to one or more embodiments shown and described herein. As shown, a computing device 400 may include a processor 402, and data storage 404 including instructions 405. The computing device may further include a communication interface 406, a sensor 408, and a user interface 410, each of which are communicatively connected via a system bus 412. Any component or combination of components of the disclosed embodiments may take the form of or include a computing device 400. It should be understood that computing device 400 may include different and/or additional components, and some or all of the functions of a given component could instead be carried out by one or more different components. Additionally, computing device 400 could take the form of (or include) a plurality of computing devices, and some or all of the functions of a given component could be carried out by any combination of one or more of the computing devices in the plurality.

Processor 402 may take the form of one or more general-purpose processors and/or one or more special-purpose processors, and may be integrated in whole or in part with data storage 404, communication interface 406, sensor 408, user interface 410, and/or any other component of computing device 400, as examples. Accordingly, processor 402 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 404 may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a relational database management system (RDBMS), any other non-volatile storage, or any combination of these, to name just a few examples.

Instructions 405 may be stored in data storage 404, and may include machine-language instructions executable by processor 402 to cause computing device 400 to perform the computing-device functions described herein. Additionally or alternatively, instructions 405 may include script instructions executable by a script interpreter configured to cause processor 402 and computing device 400 to execute the instructions specified in the script instructions. In an embodiment, the instructions include instructions executable by the processor to cause the computing device to execute an artificial neural network. It should be understood that instructions 405 may take other forms as well.

Additional data may be stored in data storage 404, such as observed vehicle trajectories, indicated similarities and/or classifications of observed vehicle trajectories, an intermediate space of intermediate representations of observed vehicle trajectories, and/or network parameters of a neural network, as will be described in further detail below. The additional data could be stored such as a table, a flat file, data in a filesystem of the data storage, a heap file, a B+ tree, a hash table, a hash bucket, or any combination of these, as examples.

Communication interface 406 may be any component capable of performing the communication-interface functions described herein, including facilitating wired and/or wireless communication between computing device 400 and another entity. As such, communication interface 406 could take the form of an Ethernet, Wi-Fi, Bluetooth, and/or USB interface, among many other examples. Communication interface 406 may receive data over a network via communication links, for instance.

Sensor 408 could take the form of one or more sensors operable to perform any of the sensor functions described herein. The sensor could be positioned on a vehicle, including an interior and/or exterior of a vehicle. Though sensor 408 may be referenced in the singular throughout this disclosure, it should be understood that sensor 408 may take the form of (or include) a single sensor or multiple sensors.

The sensor could include a radar sensor, a LIDAR sensor, a camera, an accelerometer, a speedometer, or any combination of these or other sensors. The radar sensor, LIDAR sensor, and/or camera may obtain signals (such as electromagnetic radiation) that can be used by computing device 400 to obtain information regarding a road agent and/or other objects in an environment of a vehicle or other entity of the disclosed embodiments. For example, the radar sensor and/or LIDAR sensor may send a signal (such as pulsed laser light or radio waves) and may obtain a distance measurement from the sensor to the surface of a road agent or other object based on a time of flight of the signal—that is, the time between when the signal is sent and when the reflected signal (reflected by the object surface) is received by the sensor. The camera may collect light or other electromagnetic radiation and may generate an image representing a trajectory of a road agent or an environment of a system entity based on the collected radiation. Additionally or alternatively, the accelerometer and the speedometer may be used to detect an acceleration and a speed of a road agent, respectively. Sensor 408 may take other forms as well.

User interface 410 may be any component capable of carrying out the user-interface functions described herein. For example, the user interface may be configured to receive input from a user and/or output information to the user. Output may be provided via a computer monitor, a loudspeaker (such as a computer speaker), or another component of (or communicatively linked to) computing device 400. User input might be achieved via a keyboard, a mouse, or other component communicatively linked to the computing device. As another possibility, input may be realized via a touchscreen display of the computing device in the form of a smartphone or tablet device. Some components may provide for both input and output, such as the aforementioned touchscreen display. It should be understood that user interface 410 may take numerous other forms as well.

System bus 412 may be any component capable of performing the system-bus functions described herein. In an embodiment, system bus 412 is any component configured to transfer data between processor 402, data storage 404, communication interface 406, sensor 408, user interface 410, and/or any other component of computing device 400. In an embodiment, system bus 412 includes a traditional bus as is known in the art. In other embodiments, system bus 412 includes a serial RS-232 communication link, a USB communication link, and/or an Ethernet communication link, alone or in combination with a traditional computer bus, among numerous other possibilities. In some examples, system bus 412 may be formed from any medium that is capable of transmitting a signal, such as conductive wires, conductive traces, or optical waveguides, among other possibilities. Moreover, system bus 412 may be formed from a combination of mediums capable of transmitting signals. The system bus could take the form of (or include) a vehicle bus, such as a local interconnect network (LIN) bus, a controller area network (CAN) bus, a vehicle area network (VAN) bus, or any combination of these or mediums. It should be understood that system bus 412 may take various other forms as well.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A multi-part steering apparatus comprising:
an outer rim; and
an inner hub,
wherein:
the outer rim rotates relative to the inner hub with an adjustable rotation resistance; and
the inner hub rotates relative to the outer rim with the adjustable rotation resistance.

2. The multi-part steering apparatus of claim 1, further comprising:
a rotatable mechanical interface connecting the outer rim to the inner hub; and
a damper connected to the rotatable mechanical interface and configured to change the rotation resistance between the outer rim and inner hub.

3. The multi-part steering apparatus of claim 1, wherein the rotatable mechanical interface comprises a rack and pinion mechanism.

4. The multi-part steering apparatus of claim 1, wherein the rotatable mechanical interface comprises:
a gear track disposed on an inside portion of the outer rim; and
one or more gears attached to the inner hub and positioned to mesh with the gear track.

5. The multi-part steering apparatus of claim 1, wherein the rotatable mechanical interface comprises:
a friction track disposed on an inside portion of the outer rim; and
one or more wheels attached to the inner hub and positioned to contact the friction track.

6. The multi-part steering apparatus of claim 1, wherein the damper comprises:
an electric motor connected to the rotatable mechanical interface; and
an adjustable load connected to terminals of the electric motor.

7. The multi-part steering apparatus of claim 6, wherein the damper is further configured to:
receive a weighting signal from a vehicle computing device; and
change the rotation resistance by adjusting the adjustable load based on the weighting signal.

8. The multi-part steering apparatus of claim 1, wherein the inner hub is connected to a vehicle steering system.

9. The multi-part steering apparatus of claim 8 wherein the vehicle steering system comprises a drive-by-wire steering system.

10. The multi-part steering apparatus of claim 8 wherein the vehicle steering system comprises a mechanical steering system.

11. A vehicle comprising:
vehicle computing device configured to generate a weighting signal;
a multi-part steering apparatus comprising and inner hub and an outer rim,
wherein the outer rim rotates relative to the inner hub with an adjustable rotation resistance corresponding to the weighting signal.

12. The vehicle of claim 11, further comprising:
a rotatable mechanical interface connecting the outer rim to the inner hub; and
a damper connected to the rotatable mechanical interface and configured to change the rotation resistance between the outer rim and inner hub.

13. The vehicle of claim 11, wherein the rotatable mechanical interface comprises a rack and pinion mechanism.

14. The vehicle of claim 11, wherein the rotatable mechanical interface comprises:
a gear track disposed on and inside portion of the outer rim; and
one or more gears attached to the inner hub and positioned to mesh with the gear track.

15. The vehicle of claim 11, wherein the rotatable mechanical interface comprises:
a friction track disposed on an inside portion of the outer rim; and
one or more wheels attached to the inner hub and positioned to contact the friction track.

16. The vehicle of claim 11, wherein the damper comprises:
an electric motor connected to the rotatable mechanical interface; and
an adjustable load connected to terminals of the electric motor.

17. The vehicle of claim 16, wherein the damper is further configured to:
receive a weighting signal from the vehicle computing device; and
change the rotation resistance by adjusting the adjustable load based on the weighting signal.

18. The vehicle of claim 11, wherein the inner hub is connected to a vehicle steering system.

19. The vehicle of claim 18 wherein the vehicle steering system comprises a drive-by-wire steering system.

20. The vehicle of claim 18 wherein the vehicle steering system comprises a mechanical steering system.

* * * * *